US007810311B2

(12) United States Patent
Schwarz et al.

(10) Patent No.: US 7,810,311 B2
(45) Date of Patent: *Oct. 12, 2010

(54) COOLING EXCHANGER DUCTS (75) Inventors: Frederick M. Schwarz, Glastonbury, CT (US); Jorn A. Glahn, Manchester, CT (US)

(73) Assignee: United Technologies Corporation, Hartford, CT (US)

( * ) Notice: Subject to any disclaimer, the term of this patent is extended or adjusted under 35 U.S.C. 154(b) by 902 days.

This patent is subject to a terminal disclaimer.

(21) Appl. No.: 11/650,825

(22) Filed: Jan. 8, 2007

(65) Prior Publication Data

US 2008/0006022 A1 Jan. 10, 2008

Related U.S. Application Data (63) Continuation-in-part of application No. 11/481,550, filed on Jul. 6, 2006.

(51) Int. Cl.
*F02K 99/00* (2009.01)

(52) U.S. Cl. .................. 60/266; 60/226.1; 60/39.08

(58) Field of Classification Search ........... 60/226.1, 60/39.08, 39.83, 262, 266, 267; 415/176–178; 184/6.11; 165/100, 103
See application file for complete search history.

(56) References Cited

U.S. PATENT DOCUMENTS

| 2,625,009 | A | * | 1/1953 | Leggett et al. ............. 60/785 |
| 2,865,580 | A | * | 12/1958 | Marshall ..................... 244/57 |
| 3,080,716 | A | * | 3/1963 | Cummings et al. .......... 60/736 |
| 4,409,788 | A | * | 10/1983 | Nash et al. ................ 60/226.3 |
| 4,640,183 | A | * | 2/1987 | Doi ............................ 454/75 |
| 5,438,823 | A | * | 8/1995 | Loxley et al. ............. 60/39.08 |
| 5,987,877 | A | * | 11/1999 | Steiner ..................... 60/39.08 |
| 6,000,210 | A | * | 12/1999 | Negulescu ................. 60/772 |
| 6,282,881 | B1 | * | 9/2001 | Beutin et al. ............. 60/39.08 |
| 2007/0245738 | A1 | * | 10/2007 | Stretton et al. ............ 60/728 |
| 2007/0264133 | A1 | * | 11/2007 | Schwarz et al. ........... 417/110 |
| 2008/0016845 | A1 | * | 1/2008 | Zysman et al. ............ 60/226.1 |

* cited by examiner

*Primary Examiner*—Michael Cuff
*Assistant Examiner*—Phutthiwat Wongwian
(74) *Attorney, Agent, or Firm*—Kinney & Lange, P.A.

(57) ABSTRACT

A heat exchange system for use in operating equipment in which a working fluid is utilized in providing selected operations thereof, including for use in lubricating systems for aircraft turbofan engine equipment, the heat exchange system for providing air and working fluid heat exchanges to cool the working fluid at selectively variable rates in the operating equipment developed airstreams. A heat exchanger core is provided in a controlled air flow duct system opening at its entrance to those airstreams and having its outlet end opening downstream in those airstreams.

15 Claims, 6 Drawing Sheets

COOLING EXCHANGER DUCTS

CROSS-REFERENCE TO RELATED APPLICATION

This application is a Continuation-In-Part of application Ser. No. 11/481,550 filed Jul. 6, 2006 titled "COOLING EXCHANGER DUCT".

BACKGROUND OF THE INVENTION

The present invention relates to lubrication systems for turbine engines and for associated equipment, and more particularly, to air and lubricant heat exchangers for use in maintaining desired temperatures of the lubricants in such engines and equipment.

Lubrication systems for turbine engines, such as a turbofan engine, and for associated equipment, such as an integrated drive generator, provide pressurized lubricant, an oil, to lubricate, cool and clean the engine main bearings, gear box gears, and the like, and again for the lubrication of bearings and other parts in equipment associated with such turbine engines. During such lubrications, heating of the lubricant is caused to occur due to mechanical energy losses in the lubricated apparatus. Thermal management of such lubricants is very important for continued successful operation of such lubrication systems in the apparatus lubricated thereby.

The amount of heat necessary to be ejected from lubricants in such systems is increasing because of the use of larger electrical generators, for instance, in aircraft turbine engines due to increasing consumption of electrical power in the aircraft powered thereby, and because of the advances in aircraft turbine engines such as the use of geared turbofans for such aircraft with large fan-drive gearboxes. Despite the added heat generated by such modified and expanded equipment, the necessary lubricating oil operating temperature ranges to provide satisfactory lubricating performance have not changed for the most part and, in some instances, the upper operating temperature limits have been reduced.

The lubrication system for a turbofan engine in an aircraft typically has a first heat exchanger having passageways through which lubricating oil passes to be cooled by the fuel stream flowing past and around these passageways. This arrangement permits the lubricating oil to reject heat therein to the fuel in the aircraft thereby heating that fuel to help recover some of the energy lost in the combustor of the engine. Because in some flight situations more heat is generated in the lubricating oil than can be accepted for warming the fuel, a portion of the lubricating oil can be forced to bypass the heat exchanger for the fuel and the lubricating oil, and the oil can be directed to a further heat exchanger where the heat therein is transferred to the air in the secondary airstream provided by the fan of the turbofan engine. In a typical arrangement, a duct is provided in the fan cowling through which a portion of the airstream is diverted, and the air and lubricating oil heat exchanger is placed in this duct so that the lubricating oil passing through passageways in that heat exchanger is cooled by the duct airstream flowing past these passageways in the exchanger. If such additional cooling of the oil is not needed in a flight situation, the lubricating oil can again be forced to bypass this air and lubricating oil heat exchanger.

However, the fan airstream that is diverted to pass through the lubricating oil and air heat exchanger in such duct systems flows at least in part through that exchanger, and the exchanger should be large enough, insofar as assuring that a sufficient part of the cooling engine fan airstream flows over a sufficient amount of lubricating oil flowing in passageways therein, to provide adequate oil cooling for the most extreme flight conditions encountered. Larger heat exchangers require larger cross sectional area ducts, and such an air and lubricating oil heat exchanger duct based system continually leads to thrust losses in the turbofan engine. Hence, there is a strong desire for an air and lubricating oil heat exchanger duct based system that reduces such thrust losses and also reduces the volume required therefor in the more compact spaces in advanced turbofan engines.

BRIEF SUMMARY OF THE INVENTION

The present invention provides a heat exchange system for use in operating equipment in which a working fluid is utilized in providing selected operations thereof, the heat exchange system providing air and working fluid heat exchanges to cool the working fluid at selectively variable rates in airstreams occurring with uses of the equipment. The system has a cooling duct extending through at least a portion of a stream structure that is positioned providing access to the airstreams occurring during use, with the cooling duct having an entrance opening on an upstream side and an exit opening on a downstream side. A moveable entrance flap can be disposed on the upstream side of the cooling duct such that the moveable entrance flap covers at least a portion of the entrance opening when in a closed position that permits flow of air through the cooling duct when in an open position, and a moveable exit flap is disposed on the downstream side of the cooling duct such that the moveable exit flap covers at least a portion of the exit opening when in a closed position that permits flow of air through the cooling duct when in an open position. A heat exchanger core is provided in the cooling duct between the entrance and exit openings thereof, and has a plurality of passageway structures therein about which air can pass in flowing therethrough with the passageway structures being coupled to an input conduit at one end thereof and coupled to an output conduit at an opposite end thereof to enable the working fluid to be provided, and removed from, interiors of the passageway structures through interiors of the input and output conduits.

DETAILED DESCRIPTION

A smaller cross sectional area heat exchanger leads to enabling its use in a duct of a smaller cross sectional area to thereby improve the compactness of the resulting cooling subsystem. Achieving the same cooling of a working fluid, such as a lubricant, passing through such a smaller cross sectional area heat exchanger generally requires that a larger volume of air pass through that heat exchanger per unit time about the passageways thereof to which the working fluid is delivered and through which the previously heated working fluid is flowing to be cooled. The working fluid cooled in those passageways is thereafter subsequently be introduced to the remainder of the system making use of that fluid. Such an increase in volume rate of air passing through the heat exchanger in a smaller cross sectional area duct generally requires that the pressure gradient from the duct entrance to the duct exit be sufficiently greater to result in such a flow. Although the present invention is useable with any working fluid provided in connection with a gas turbine engine that needs cooling, the remainder of the specification will describe an embodiment in which the working fluid is a lubricant.

A relatively large pressure gradient exists in a turbofan engine between the beginning of the fan stream in the turbofan engine and the ambient atmosphere. Thus, locating the duct in the engine nacelle lower bifurcation, or in some other engine nacelle bifurcation or in the engine core or outer cowlings, to extend from an upstream side near the engine fan to a downstream side at about the end or past the end of the engine fan stream nozzle can provide a significantly greater airflow through that duct to thereby allow reducing the duct cross sectional area and that of the air and lubricant heat exchanger contained therein.

In addition, if the temperature of the engine fuel from its source is low enough to allow the fuel to absorb sufficient heat from the lubricant in the fuel and lubricant heat exchanger in the engine fuel system, the air and lubricant heat exchanger may not be needed, or may not be needed to its full cooling capacity. This situation allows the air flow through the duct to be reduced by providing a duct exit flap that can be controlled to provide the desired cross sectional area for the duct exit, an area that can be kept to the allowable area needed for sufficient lubricant cooling to thereby increase the thrust produced by the escaping air at the duct exit. Often, a duct entrance flap is also provided, typically allowing a duct entrance cross sectional area that is half again as large as the duct exit cross sectional area being then currently provided by the duct exit flap, but which closes the duct entrance if the duct exit flap has closed the duct exit to thereby reduce the drag due to the duct. These two flaps can be commonly controlled insofar as setting the corresponding duct cross sectional openings by using a single flap actuator operating a proportional linkage joining the two flaps, by an actuator for each of these flaps operated by a common actuator controller (not shown) or by any other means that can effect movement of either one of the flaps or both of the flaps.

Figure 1:
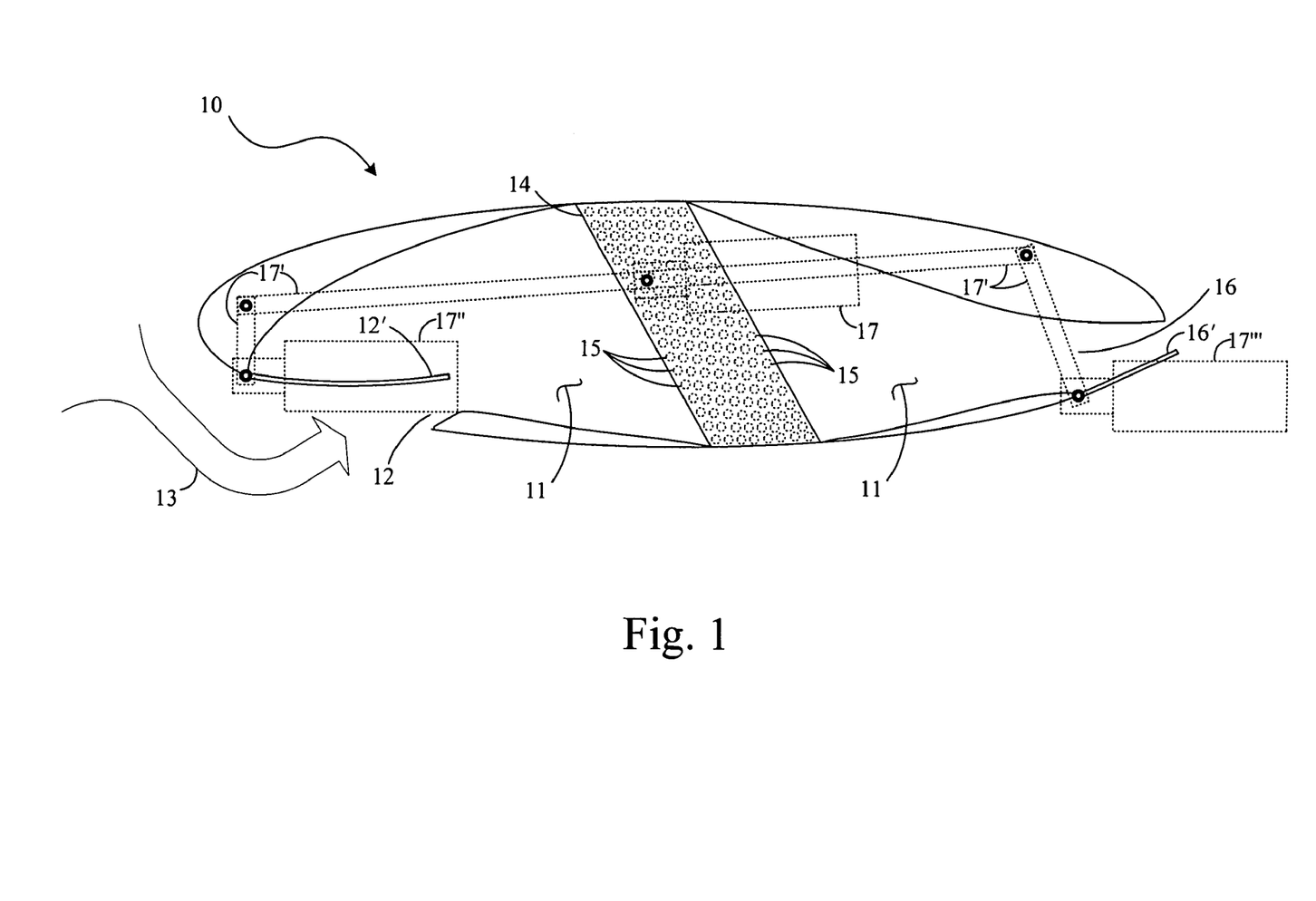
FIG. 1 shows a cross sectional top view representation of a turbofan engine fan duct lower bifurcation structure embodying the present invention.

Thus, in FIG. 1, there is shown a top view of a fan duct lower bifurcation structure, 10, having an airstream cooling duct, 11, beginning upstream at a duct inlet, 12, and extending from there in this structure over a portion of its length downstream to an exit location to extend through a portion of the interior of bifurcation structure 10. An airstream, 13, from a portion of the turbofan engine fan airstream, or fan stream, enters duct 11 at inlet 12 controlled by a duct entrance flap, 12', to pass through a heat exchanger, 14, that uses airstream 13 to cool lubricating oil in the engine lubrication system forced under pressure through a plurality of oil carrying tubes, 15, that are suitably connected into the lubrication system by being connected at one end to an input conduit and at the opposite end to an output conduit so as to allow lubricant oil therein to flow through these tubes. Airstream 13 flows about, and then past, those tubes to reach an exit, 16, of duct 11 at its downstream end which has an exit cross sectional area that is controlled in magnitude by an exit flap, 16'.

Entrance flap 12' can be selectively rotated forcibly inward or outward from the position thereof shown in FIG. 1, and exit flap 16' can be selectively rotated forcibly inward or outward from the position thereof shown in that figure, by angle positioning motor, 17, causing a proportional linkage arrangement, 17' to correspondingly move these flaps, and the linkage components, about pins shown in bold dark circles and about the shaft coupled to that motor. Alternatively, entrance flap 12' can be so selectively rotated, and exit flap 16' can be so selectively rotated, by a corresponding one a pair of angle positioning motors, 17" and 17''', directly coupled thereto by corresponding shafts. In turbofan engines that have the airstreams in the fan duct of a sufficiently small Mach number, flap 12' may be omitted.

Figure 2:
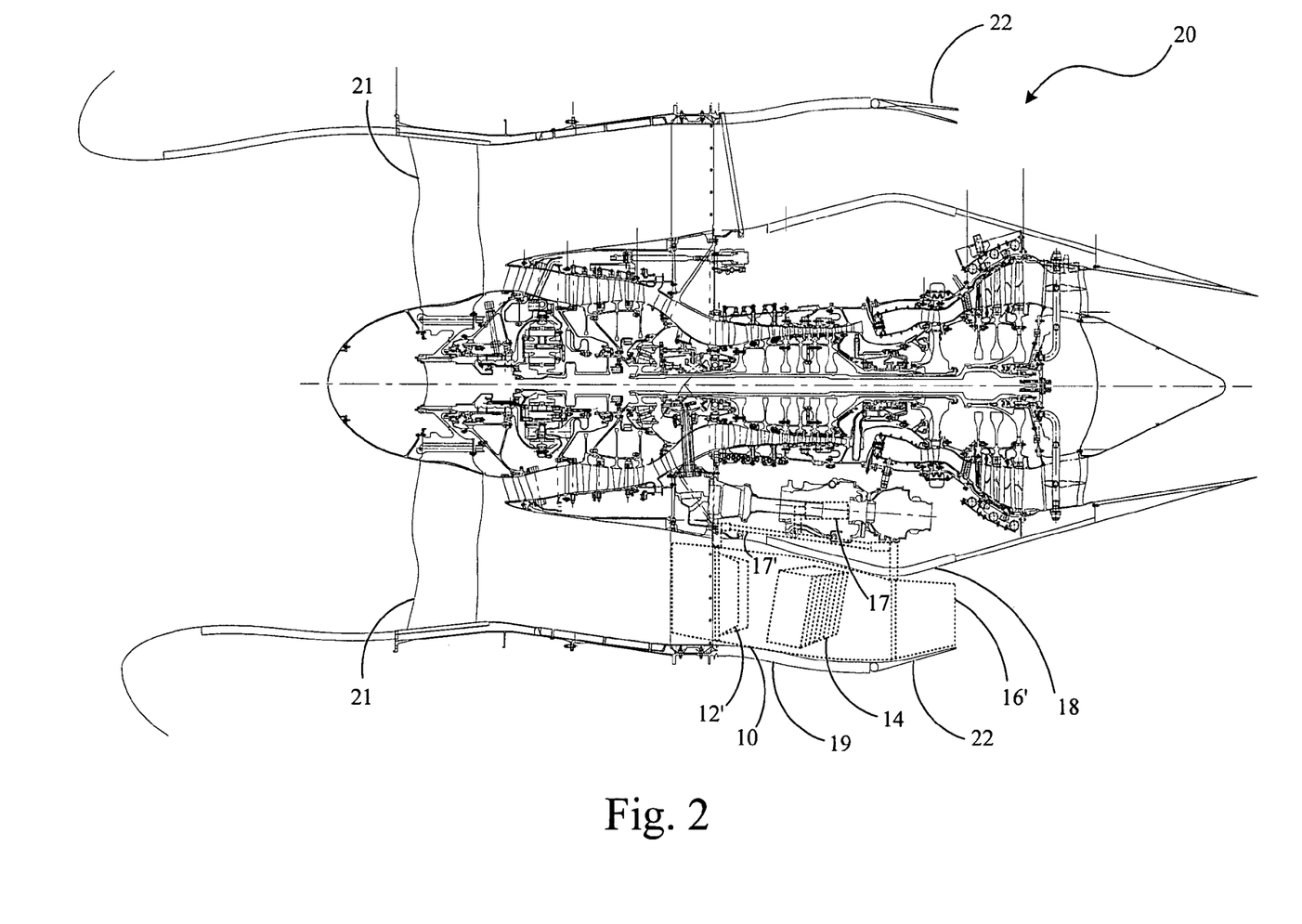
FIG. 2 shows a side view partially cut away of a turbofan engine and a further representation of the turbofan engine fan duct lower bifurcation structure of FIG. 1 embodying the present invention.
Figure 3:
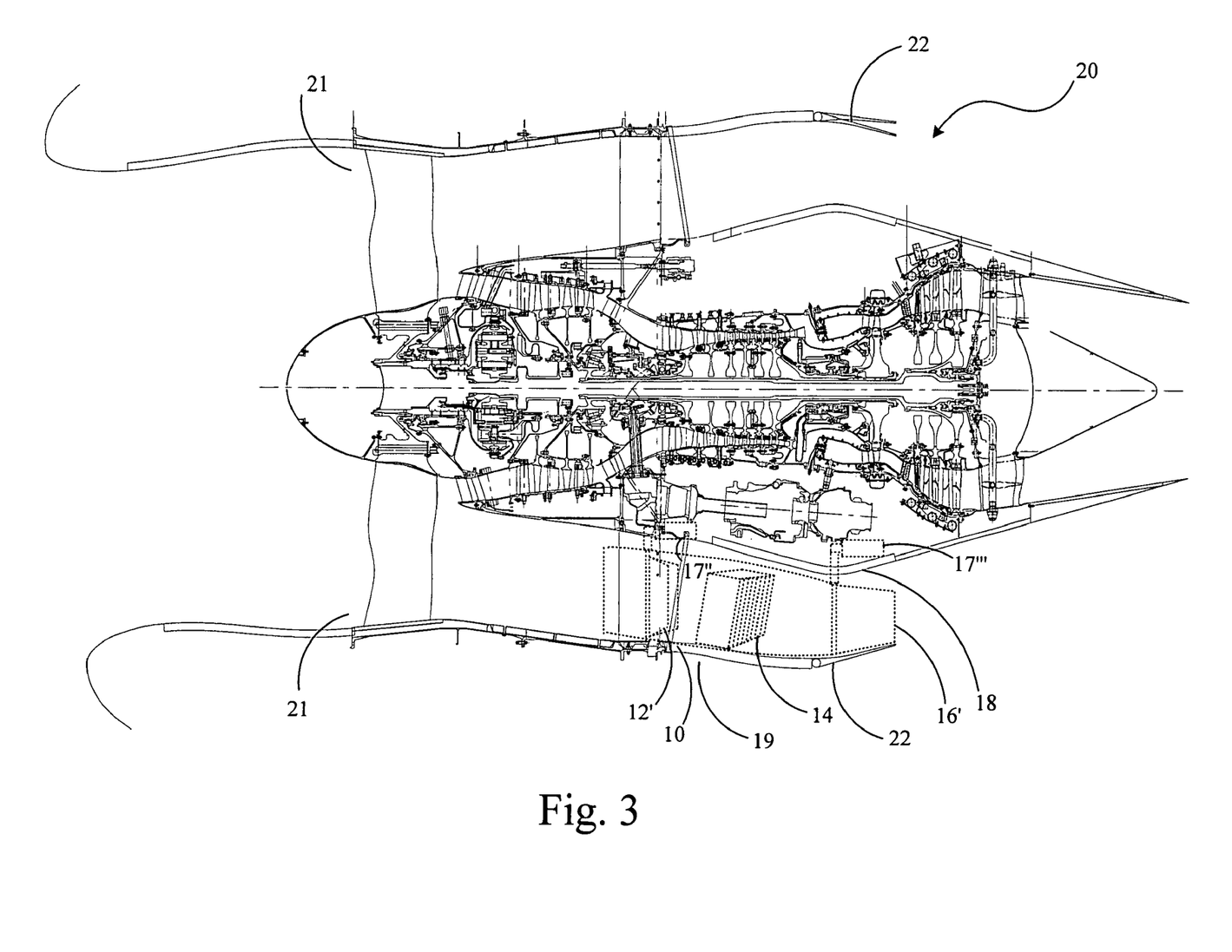
FIG. 3 shows a side view partially cut away of a turbofan engine and a further representation of the turbofan engine fan duct lower bifurcation structure of FIG. 1 embodying an alternative version of the present invention.

Bifurcation structure 10 is positioned between the bottom of the wall of an engine core cowling, 18, and the bottom of the wall of an outer cowling, 19, of the engine pod for a turbofan engine, 20, as indicated in the partially cut away views shown in FIGS. 2 and 3 in which only a portion of outer cowling 19 is shown. Shown in turbofan engine 20 among other components is the fan, 21, and the fan duct nozzle, 22, with the fan duct extending therebetween. FIG. 2 provides a representation of fan duct lower bifurcation structure 10 including airstream duct 11 with flaps 12' and 16' to be operated by angle positioning actuator or motor 17 directing proportional linkage arrangement 17'.

Figure 4:
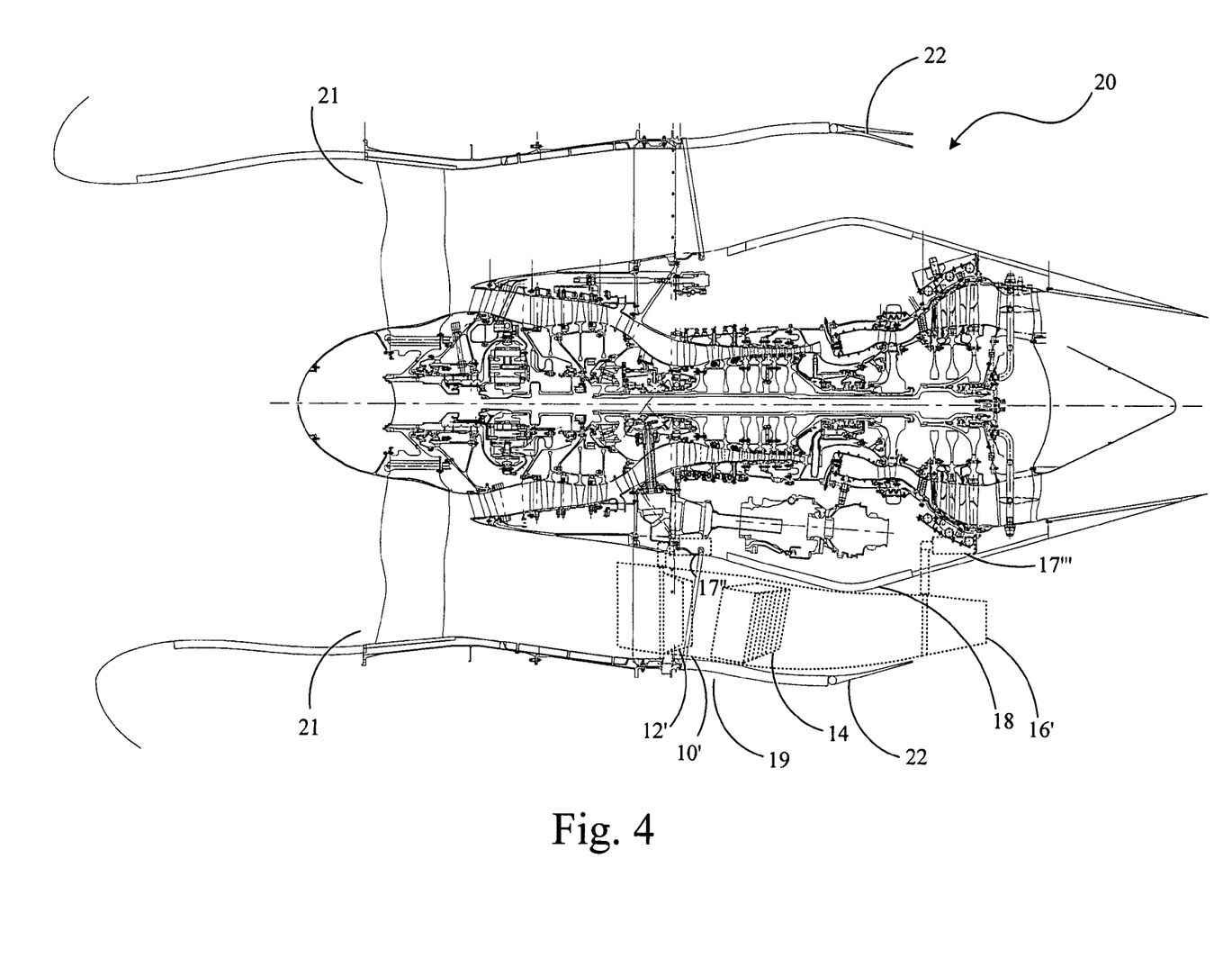
FIG. 4 shows a side view partially cut away of a turbofan engine and a further representation of the turbofan engine fan duct lower bifurcation structure of FIG. 1 embodying an alternative version of the present invention.

FIG. 3 alternatively provides a representation of fan duct lower bifurcation structure 10 including airstream duct 11 with flaps 12' and 16' to be directly operated by angle positioning actuators or motors 17" and 17''', respectively. In contrast to FIGS. 2 and 3, FIG. 4 shows a lengthened bifurcation structure, 10', extending past fan duct nozzle 22, and so outside of the turbofan engine fan duct into the atmosphere, and so fan duct nozzle 22 is configured to be capable of closing against, or nearly closing against, the wall of structure 10' to close, or nearly close, off the fan duct.

Figure 5:
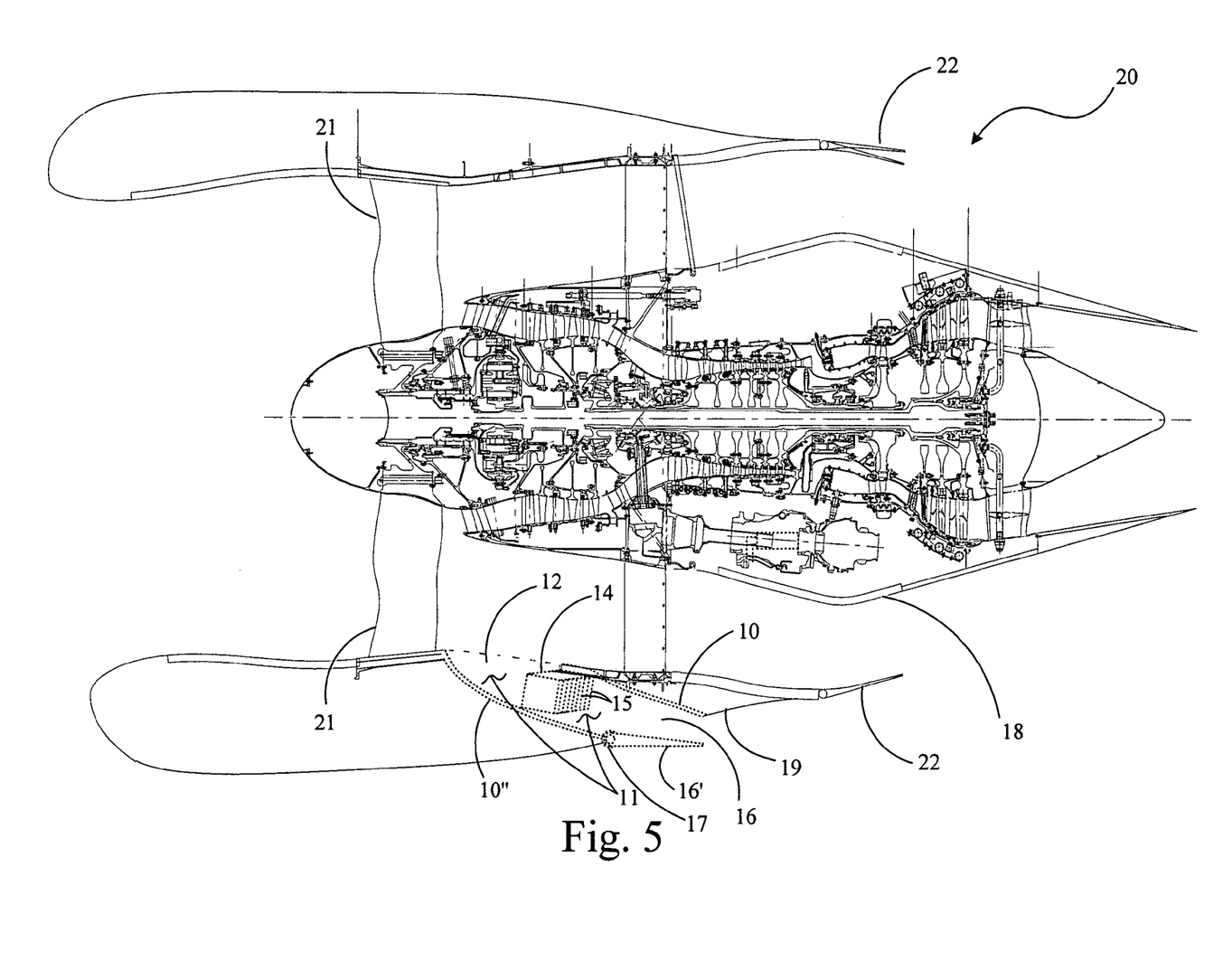
FIG. 5 shows a side view partially cut away of a turbofan engine and a representation of the turbofan engine fan duct cowling structure embodying an alternative version of the present invention.
Figure 6:
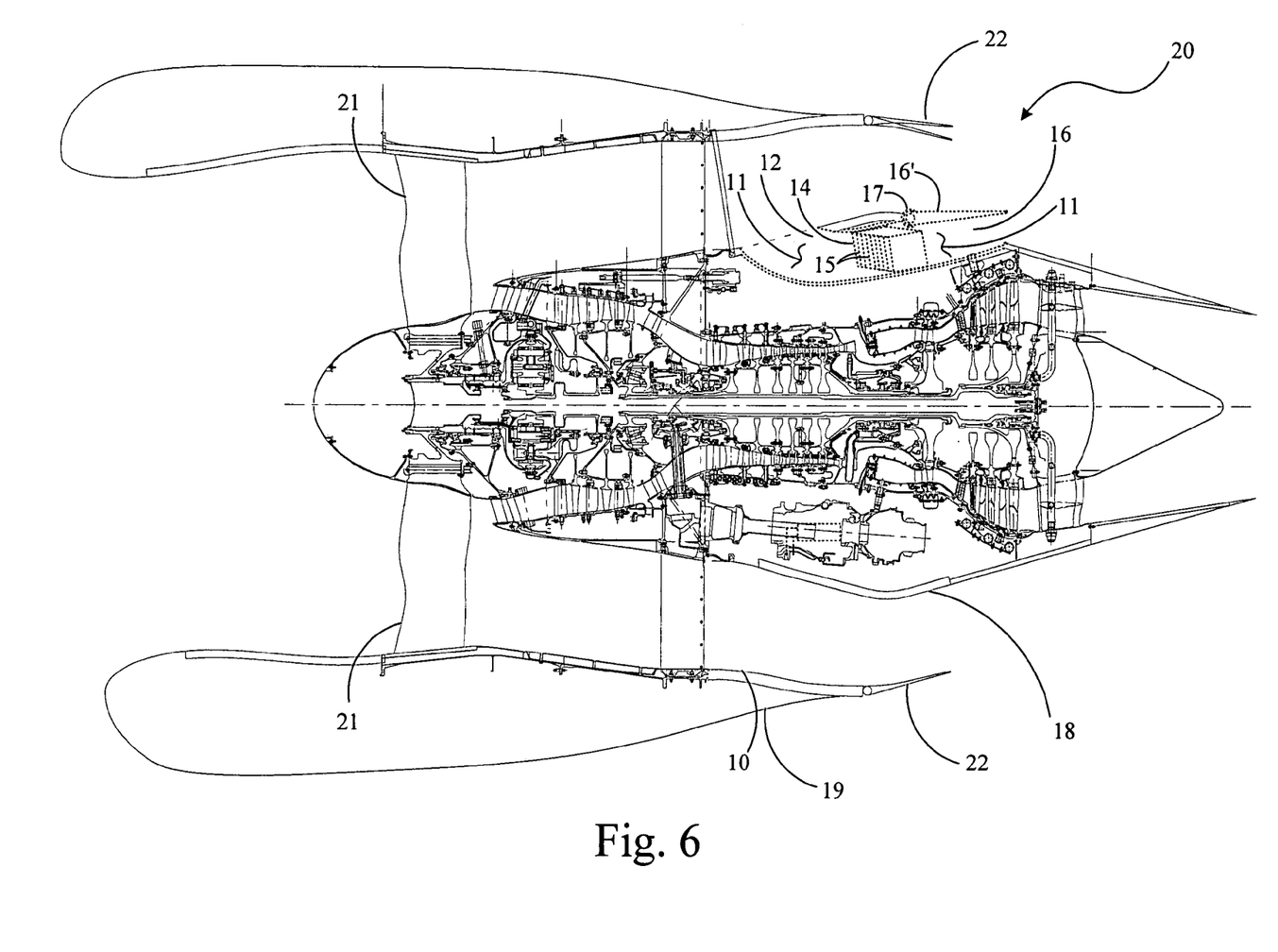
FIG. 6 shows a side view partially cut away of a turbofan engine and another representation of the turbofan engine fan duct cowling structure embodying an alternative version of the present invention.

Alternative to the providing of the heat exchanger duct 11 in bifurcation structures 10 or 10', duct structure 11 can be provided again with its input 12 in the fan airstream but then extending either through outer cowling 18, as in FIG. 5, or through engine core cowling 19 to extend through a portion of the engine compartment about which core cowling 19 is provided and back out of core cowling 19 to the atmosphere as shown in FIG. 6. Outer cowling 19 is shown in full cross section in FIGS. 5 and 6. Ducts 11 in each of these figures are shown with exit flap 16' present and operated by angle positioning actuator or motor 17''' to control the amount of exit 16 that is open to the atmosphere during engine operation. This control of flap 16' by a suitable controller (not shown) sets the degree of cooling of the oil in tubes 15 of air and oil heat exchanger 14 and the amount of thrust recovery. Devices other than flaps can be used to selectively reduce the area of exit opening 16 such as a variable area nozzle. Also, a duct entrance opening flap, or other entrance opening selective opening area actuator, can be provided at duct opening 12 in the ducts of FIGS. 5 and 6.

Although the present invention has been described with reference to preferred embodiments, workers skilled in the art will recognize that changes may be made in form and detail without departing from the spirit and scope of the invention.

The invention claimed is:

1. A heat exchange system for use in operating equipment in which a working fluid is utilized in providing selected operations thereof, the heat exchange system providing air and working fluid heat exchanges to cool the working fluid at selectively variable rates in airstreams occurring with uses of the equipment, the system comprising:
   a cooling duct extending through at least a portion of a stream structure that is positioned providing access to the airstreams occurring during use with air accessed at an entrance opening at an upstream side of the cooling duct flowing therethrough, the cooling duct having an entrance opening on the upstream side and an exit opening on a downstream side;
   a moveable entrance flap disposed on the upstream side of the cooling duct such that the moveable entrance flap covers at least a portion of the entrance opening, when in a closed position to thereby restrict the air from entering the cooling duct and permits a selected flow of the air through the cooling duct when in an open position;
   a moveable exit flap disposed on the downstream side of the cooling duct such that the moveable exit flap covers at least a portion of the exit opening when in a closed position and permits flow of the air through the cooling duct when in an open position; and
   a heat exchanger core provided in the cooling duct between the entrance and exit openings thereof and having a plurality of passageway structures therein about which the air passes in flowing therethrough with the passageway structures being coupled to an input conduit at one end thereof and coupled to an output conduit at an opposite end thereof to enable the working fluid to be provided, and removed from, interiors of the passageway structures through interiors of the input and output conduits.

2. The system of claim 1 wherein said stream structure is a selected one of a) a fan duct lower bifurcation structure positioned between the bottom of the wall of an engine core cowling about the engine compartment and the inside of the outer cowling of an engine pod for a turbofan engine with the end of the cooling duct located about at or outside of the end of the fan duct nozzle of the turbofan engine, b) a portion of an engine core cowling about the engine compartment for a turbofan engine with the end of the cooling duct located about at or outside of the end of the fan duct nozzle of the turbofan engine, and c) a portion of the outer cowling of an engine pod for a turbofan engine.

3. The system of claim 2 wherein the cooling duct extends through the engine core cowling at a first location to from there extend through a portion of the engine compartment about which the engine core cowling is provided and to then again extend through engine core cowling at a second location.

4. The system of claim 2 wherein the entrance flap is positioned at the cooling duct entrance opening and is rotatable about an axis substantially parallel to an axis intersecting opposite edges of the cooling duct entrance opening.

5. The system of claim 2 wherein the exit flap is positioned at the cooling duct exit opening and is rotatable about an axis substantially parallel to an axis intersecting opposite edges of the cooling duct exit opening.

6. The system of claim 1 further comprising a first flap actuator being connected to a mechanical linkage that is also connected to both the entrance and exit flaps so as to allow the first flap actuator to force the entrance and exit flaps to change positions.

7. The system of claim 6 wherein the entrance flap is opened by the mechanical linkage to expose more cross sectional area of the entrance opening than the exit flap is opened by the mechanical linkage to expose cross sectional area of the exit opening.

8. The system of claim 6 wherein the entrance flap is closed by the mechanical linkage over the entrance opening if the exit flap is closed by the mechanical linkage over the exit opening.

9. The system of claim 1 further comprising a first flap actuator being connected to the entrance flap so as to allow the first flap actuator to force the entrance flap to change positions, and further comprising a second flap actuator being connected to the exit flap so as to allow the second flap actuator to force the exit flap to change positions.

10. The system of claim 9 wherein the entrance flap is opened by the first flap actuator to expose more cross sectional area of the entrance opening than the exit flap is opened by the second flap actuator to expose cross sectional area of the exit opening.

11. The system of claim 9 wherein the entrance flap is closed by the first flap actuator over the entrance opening if the exit flap is closed by the second flap actuator over the exit opening.

12. A heat exchange system for use in lubricating systems for aircraft turbofan engine equipment in which a lubricant is provided under pressure to spaces bounded at least in part by surfaces moving relative to one another, the heat exchange system for providing air and lubricant heat exchanges to cool the lubricant at selectively variable rates in fan airstreams occurring on a stream side of an engine fan duct wall during at least some operations of the turbofan engine where the fan duct extends between the turbofan engine fan and a fan duct nozzle, the system comprising:
   a cooling duct extending through at least a portion of a stream structure that is positioned providing access to the airstreams occurring on the stream side of the engine fan duct wall with air from such airstreams flowing therethrough, the cooling duct having a duct entrance opening to the fan airstreams of the turbofan engine and a moveable exit flap to at least in part cover a portion of an exit opening of the cooling duct;
   a flap actuator which forces the exit flap to open or close to a selected extent over the exit opening; and
   a heat exchanger core provided in the cooling duct between the entrance and exit openings thereof and having a plurality of passageway structures therein about which the air passes in flowing therethrough with the passageway structures being coupled to an input conduit at one end thereof and coupled to an output conduit at an opposite end thereof to enable the working fluid to be provided, and removed from, interiors of the passageway structures through interiors of the input and output conduits.

13. The system of claim 12 wherein said stream structure is a selected one of a) a fan duct lower bifurcation structure positioned between the bottom of the wall of an engine core cowling about the engine compartment and the inside of the outer cowling of an engine pod for a turbofan engine with the end of the cooling duct located about at or outside of the end of the fan duct nozzle of the turbofan engine, b) a portion of an engine core cowling about the engine compartment for a turbofan engine with the end of the cooling duct located about at or outside of the end of the fan duct nozzle of the turbofan engine, and c) a portion of the outer cowling of an engine pod for a turbofan engine.

14. The system of claim 13 wherein the exit flap is positioned at the cooling duct exit opening and is rotatable about an axis substantially parallel to an axis intersecting opposite edges of the cooling duct exit opening.

15. The system of claim 13 wherein the cooling duct extends through the engine core cowling at a first location to from there extend through a portion of the engine compartment about which the engine core cowling is provided and to then again extend through engine core cowling at a second location.

* * * * *